United States Patent
Chelaidite et al.

(10) Patent No.: US 9,644,693 B2
(45) Date of Patent: May 9, 2017

(54) SEQUENTIAL PARKING BRAKE ASSEMBLY

(71) Applicant: AKEBONO BRAKE INDUSTRY CO., LTD., Chuo-ku, Tokyo (JP)

(72) Inventors: Galus Chelaidite, South Lyon, MI (US); Waleed Mahmoud Al-Mahshi, Dearborn Heights, MI (US); Carla Thomas, Royal Oak, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 0 days.

(21) Appl. No.: 14/940,297

(22) Filed: Nov. 13, 2015

(65) Prior Publication Data

US 2016/0215840 A1 Jul. 28, 2016

Related U.S. Application Data

(60) Provisional application No. 62/108,128, filed on Jan. 27, 2015.

(51) Int. Cl.
| | |
|---|---|
| *F16D 55/00* | (2006.01) |
| *F16D 55/227* | (2006.01) |
| *F16D 121/24* | (2012.01) |
| *F16D 125/40* | (2012.01) |

(52) U.S. Cl.
CPC .... *F16D 55/227* (2013.01); *F16D 2055/0091* (2013.01); *F16D 2121/24* (2013.01); *F16D 2125/40* (2013.01)

(58) Field of Classification Search
CPC ...... F16D 65/18; F16D 212/02; F16D 212/24; F16D 55/225; F16D 55/2255

USPC .......................................... 188/72.1, 156–164
See application file for complete search history.

(56) References Cited

U.S. PATENT DOCUMENTS

| | | | | |
|---|---|---|---|---|
| 5,090,518 | A * | 2/1992 | Schenk | B60T 8/00 188/157 |
| 6,830,141 | B1 * | 12/2004 | Neelakantan | F16D 23/12 188/158 |
| 7,219,772 | B2 | 5/2007 | Bieker et al. | |
| 7,311,180 | B2 * | 12/2007 | Baumann | F16D 65/18 188/162 |
| 7,806,241 | B2 * | 10/2010 | Takahashi | B60T 13/746 188/157 |
| 9,180,844 | B2 | 11/2015 | Murata et al. | |
| 2004/0045776 | A1 | 3/2004 | Baumgartner et al. | |
| 2004/0159509 | A1 * | 8/2004 | Chang | F16D 65/18 188/156 |

(Continued)

*Primary Examiner* — Christopher Schwartz
(74) *Attorney, Agent, or Firm* — The Dobrusin Law Firm, P.C.

(57) ABSTRACT

An assembly includes a brake system comprising a parking brake assembly including a first drive shaft and a second drive shaft. The assembly also includes two or more opposing brake pads, and a rotor extending between the two or more opposing brake pads. During use, the first drive shaft is moved so that a first portion of the brake pad is moved relative to the rotor, The second this shaft is moved so that a second portion of the brake pad is moved relative to the rotor. One of the first portion of the brake pad or the second portion of the brake pad is moved relative to the rotor before the other of the first portion of the brake pad or the second portion of the brake pad is moved relative to the rotor.

20 Claims, 5 Drawing Sheets

(56) References Cited

U.S. PATENT DOCUMENTS

2008/0257660 A1* 10/2008 Miller .................... F16D 65/18
  188/72.1
2015/0354650 A1   12/2015 Bull

* cited by examiner

FIG. 9

SEQUENTIAL PARKING BRAKE ASSEMBLY

FIELD

The present teachings generally relate to a parking brake, and more specifically to a parking brake mechanism for sequentially engaging multiple pistons against a brake pad and rotor.

BACKGROUND

The present teachings are predicated upon providing an improved parking brake system for a vehicle. Parking brake systems typically include one or more brake pads that are moved against a rotor to generate a parking brake force necessary to restrain the vehicle from moving. The parking brake force may be generated by electromechanical application of a piston. On a light vehicle platform, passenger cars and light duty trucks may include rear, single piston calipers, which can adequately decelerate a vehicle. In the case of as non-braking condition (i.e., when the vehicle is parked), a parking brake system may utilize the already existing service brake caliper structure (i.e. the single piston) to restrain movement of the vehicle. The brake pads may be moved against the rotor with a single electromechanical gear and a linkage (i.e., a spindle and nut assembly, for example) that is already integrated with the service brake caliper and designed to utilize the already existing single piston service brake caliper.

Heavy duty full size trucks, vans and SUVs may include rear, two-piston calipers to decelerate the vehicle. In the case of a non-braking condition (i.e., when a vehicle is parked), it may be desirable to have a parking brake system that utilizes the existing service brake caliper structure that moves the brake pads via an electromechanical gear and linkage (i.e., a spindle and nut assembly, for example) to generate a parking brake force. It may further be desirable to provide a parking brake force utilizing the two existing pistons and linkages (i.e., a spindle and nut assembly, for example) on the existing rear caliper to provide increased parking brake forces for heavy duty and full size truck applications, for example. The parking brake system of the present teachings aims to utilize an existing structure of a service brake caliper to provide a parking brake system in order to reduce and/or maintain vehicle packaging, costs, or both.

SUMMARY

The present teachings provide an assembly, comprising a brake system comprising a parking brake assembly including a first drive shaft and a second drive shaft; two or more opposing brake pads; and a rotor extending between the two or more opposing brake pads. The first drive shaft is moved so that a first portion of the brake pad is moved relative to the rotor. The second drive shaft is moved so that a second portion of the brake pad is moved relative to the rotor. One of the first portion of the brake pad or the second portion of the brake pad is moved relative to the rotor before the other of the first portion of the brake pad or the second portion of the brake pad is moved relative to the rotor.

The present teachings also provide a brake assembly. The brake assembly comprises a brake caliper including a brake pad; a parking brake system including a first drive shaft; a first gear selectively engaging the first drive shaft and selectively disengaging the first drive shaft; a second drive shaft; a second gear engaging the second drive shaft; and a motor gear unit engaging the first gear. The motor gear unit causes the first gear and the second gear to rotate in a first direction and a second direction. The first gear selectively engages the first drive shaft so that the first drive shaft rotates with the first gear and moves the first portion of the brake pad relative to a rotor. The first gear selectively disengages the first drive shaft so that the first drive shaft does not rotate with the first gear and does not move the first portion of the brake pad relative to the rotor. The second gear rotates the second drive shaft and moves the second portion of the brake pad relative to the rotor.

The present teachings further provide a parking brake system that utilizes an existing motor gear unit and a sequential piston apply mechanism to provide the increased parking brake threes needed for heavy duty and full size truck applications in a period of time expected by customers.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. The present teachings claim priority to U.S. Provisional Patent Application No. 62/108,138, filed on Jan.

27, 2015, the teachings of which are expressly incorporated by reference herein for all purposes.

The teachings herein provide as brake assembly. The brake assembly may include an electromechanical parking brake system that may function to create a clamping force (i.e., as parking brake force). The clamping force may be a force, which, coupled with the pad coefficient of friction, prevents rotation of a rotor, prevents movement of the vehicle, or both when the vehicle is in a stopped or parked position. The brake assembly may be an opposing brake system i.e., a fixed caliper brake system) or a floating brake system (i.e., a floating caliper).

The brake caliper may function to house the components of the brake assembly, the electromechanical parking brake system, or both. The brake caliper may function to provide for the movement of one or more brake pads, or, preferably, two or more brake pads relative to a rotor. The brake caliper may move during a brake apply (i.e., a floating caliper), or the brake caliper may be fixed so that the brake caliper does not move during a brake apply (i.e., a fixed caliper). The brake caliper may be connected to a knuckle or a support structure of a vehicle. The brake caliper may include one or more motor gear units (MGU) and a parking brake system including one or more piston assemblies developing a clamping force sequentially (i.e. a sequential parking brake assembly). The electromechanical parking brake system, the sequential parking brake assembly, or both may be located within a housing that may be connected to, attached to, and/or integrally formed with the brake caliper. The brake caliper may include one or more support brackets (i.e. supports) configured to engage the one or more brake pads. The one or more support brackets may be arranged around the rotor so that one or more brake pads are located on an inboard side of the rotor and one or more brake pads are located on an outboard side of the rotor.

The rotor may cooperate with the electromechanical parking brake system to create a friction force, a clamping force, or both. The rotor may be generally circular and may extend through a brake caliper; may be partially surrounded by a brake caliper; or both. Preferably, the rotor extends at least partially between or within the brake caliper so that the friction material of one or more brake pads faces an inboard side of the rotor, and the friction material of one or more brake pads faces an outboard side of the rotor. When the electromechanical parking brake system is actuated, the friction material of the one or more brake pads is pushed into contact with, or caused to engage one or more sides of the rotor to create the clamping force so that the vehicle is restricted or prevented from moving. When the electromechanical parking brake system is released or disengaged, the friction material of the one or more brake pads is moved away from the one or more sides of the rotor to release the clamping force so that the vehicle can move freely.

The one or more brake pads may cooperate with the brake assembly, the electromechanical parking brake system, or both and function to create a braking force, a parking brake force, or both. The one or more brake pads may function to create a braking force, a parking brake force, or both when moved into contact with another member (e.g., a rotor, drum, or the like). The one or more brake pads may function to convert the kinetic energy of a vehicle into thermal energy by friction. The one or more brake pads may include one or more ears or projections, which may engage a brake caliper, a support bracket, or both. The one or more brake pads may move relative to the brake caliper, the support bracket, the rotor, or a combination thereof. The one or more brake pads may include one or more first brake pads configured to move towards and away from one side or face of a rotor (i.e., an inboard rotor face) and one or more second brake pad configured to move towards and away from an opposing side or face of the rotor (i.e., an outboard rotor face). When the brake assembly, the electromechanical parking brake system, or both are actuated, the one or more brake pads, or portions of one or more brake pads may be moved relative to the rotor in unison, individually, sequentially, or a combination thereof. In other words, one or more brake pads may be moved towards or away from the rotor before one or more brake pads are moved towards or away from the rotor. Or, a first end of a brake pad (i.e., a leading edge) may move towards or away from the rotor in unison, individually, sequentially, or in a combination thereof with a second end of the brake pad (i.e., a trailing edge). In yet another configuration, one or more brake pads and/or one or more ends of a brake pad may initially move in unison a first distance towards the rotor, and then one or more brake pads and/or the other end of the brake pad may continue to move towards the rotor, while the other brake pads and/or the other end of a brake pad do not move. The other brake pads and/or the other end of the brake pad may then move towards the rotor once the other brake pads and/or the first end has sufficiently engaged the rotor, for example (i.e., once a partial or full braking force, parking brake force, or both are established). The same movements may be true in a reverse direction, where the one or more brake pads or portions of one or more brake pads move away from the rotor to release the braking force, the parking brake force, or both. The distance that the one or more of the brake pads move, or the distance that the ends of one or more brake pads move may vary depending on taper wear (i.e., the tendency of the friction material of a brake pad to wear unevenly during use). In other words, during a brake apply, a leading end or edge of a brake pad may contact the rotor first and/or with a greater force than the force of a trailing end or edge of the brake pad contacts the rotor, which may cause the leading end or edge to wear more or wear faster than the trailing end or edge. Accordingly, therefore, the leading end or edge of the brake pad may need to move a greater distance than the trailing end or edge to engage the rotor. The sequential parking brake assembly (i.e., the sequential piston apply mechanism, the first and second piston assemblies, or both) may move the leading and trailing ends of a brake pad sequentially and/or different varying distances towards a rotor (and away from the rotor) to account for taper wear.

The one or more brake pads may include a friction material and a pressure plate. The friction material may include one or more non-metallic materials, semi-metallic materials, fully metallic materials, and ceramic materials. The friction material may face the rotor so that when the brake pads are moved against the rotor, a friction force is created to slow, stop, and/or restrict movement of a vehicle. The friction material may be slotted or include grooves. The pressure plate may he located opposite the friction surface. One or more piston assemblies may be in communication with the pressure pate so that all or an end of a brake pad may be moved towards or away from the rotor. For example, if multiple piston assemblies are located on each side of the rotor, one piston assembly may be moved at a time so that a first end or a second end of the brake pad can contact the rotor before the other end contacts the rotor (i.e., sequential movement).

The one or more motor gear units (MGU) may function to move the one or more brake pads against a rotor to create a braking force, a parking brake force, or both. The one or more motor gear units may function to directly or indirectly (i.e., via a linkage, a sequential piston apply mechanism, a spindle and nut assembly, the like, or a combination thereof) move the one or more piston assemblies, the one or more brake pads, or both towards and/or away from a rotor to create clamping force (i.e., a braking force, a parking brake force, or both). The one or more motor gear units may include one or more motors. The one or more motors may be a DC motor. The one or more motors may be a brush motor or a brushless motor. The one or more motors may be a series wound motor, a shunt wound motor, a compound wound motor, a separately exited motor, a servomotor, or a permanent magnet motor. The one or more motor gear units may generate a torque, which, when inputted to a lead screw and a nut assembly (i.e., as spindle and nut), is sufficient to move one or more piston assemblies, one or more brake pads, or both relative to a rotor. The one or more motor gear units may generate a torque, which, when it is input to a spindle and nut assembly, is sufficient to move the one or more brake pads against a rotor to create a braking force, a parking brake force, or both. The one or more motor gear units in conjunction with a spindle and a nut assembly may generate a holding force sufficient to maintain one or more brake pads against a rotor. The one or more motor gear units may include one or more gears that may function to transfer, increase, decrease, or a combination thereof torque generated by the motor. The one or more motor gear units may be located within a housing. The housing may be integrally formed with the brake caliper, removably attached to the brake caliper, or permanently attached to the brake caliper. The one or more motor gear units may be in communication with one or more sequential piston apply mechanisms.

The one or more sequential piston apply mechanisms may function to move the one or more piston assemblies, the one or more brake pads, or both towards or away from the rotor. The one or more sequential piston apply mechanisms may function to cooperate with the one or more piston assemblies to transfer rotational force (i.e., torque) generated by the motor, the motor gear unit, or both into linear force so that one or more pistons, piston assemblies, brake pads, or a combination thereof can move towards or away from the rotor. The one or more sequential piston apply mechanisms may move the one or more piston assemblies, the ends of the one or more brake pads, or both in unison, sequentially, or in a combination thereof. The one or more sequential piston apply mechanisms may move one or more of the one or more piston assemblies a different or varying distance, the same distance, or a combination of both. Over time, as normal brake pad taper wear increases, the one or more sequential piston apply mechanisms may function to move one or more piston assemblies a different distance. For example, as a leading end of a brake pad wears more or wears faster than a trailing end of a brake pad, the one or more sequential piston apply mechanisms may function to move the one or more piston assembles at the leading ends of the one or more brake pads a greater distance than the one or more piston assemblies at the trailing edge of the one or more brake pads. The one or more sequential piston apply mechanisms may move the one or more piston assemblies at the same time and generally the same distance; may initially move the one or more piston assemblies together and then restrict movement to one or more piston assemblies while one or more piston assemblies do not move; may move one or more piston assemblies before moving one or more piston assemblies; and so on. The cane or more sequential piston apply mechanisms may move the one or more piston assemblies faster and greater distance (or, conversely, slower and a shorter distance) than another of the one or more piston assemblies. The sequential piston apply mechanism may include a first gear and a second gear.

The first gear may function to receive and transfer torque from the one or more motor gear units to the first spindle, the second gear, the second spindle, the one or more piston assemblies, the one or more brake pads, or a combination thereof to move the one or more brake pads relative to the rotor. The first gear may include a flange or an input splined shaft for engaging the motor gear unit so that the motor gear unit can rotate the first gear. The input splined shaft may include teeth, splines, and/or notches engaging corresponding teeth, splines, and/or notches on the motor gear unit. The motor gear unit, may engage the input splined shaft and cause the first gear to rotate in a first direction, a second direction, or both. The first direction may he counterclockwise and the second direction may be clockwise, or vice versa. Both of the first and second gears may include teeth, grooves, notches, channels, or like features for interconnecting the first and second gears together with a belt, chain, linkage, the like, or a combination thereof. Accordingly, the second gear may rotate in the first direction, a second direction, or both in unison with the first gear when the motor gear unit rotates the first gear. Relative to one another, the first gear and the second gear may rotate at the same speed or with different speeds. The first gear may include the same number of teeth, grooves, notches, and/or channels as the second gear so that the first gear and the second gear rotate at the same speed. In other words, the ratio of teeth on the first gear to second gear may be 1:1. The first gear may include more teeth, grooves, notches, and/or channels than the second gear so that the first gear rotates faster than the second gear. The first gear may include less teeth, grooves, notches, and/or channels than the second gear so that the first gear rotates slower than the second gear. In other words, the ratio of teeth of the first gear to the second gear may he 1:1.05 or 1:1.1 or 1:1.2.

The first drive shaft may function to transfer torque from the motor gear unit, the first gear, or both to the one or more pistol assemblies, the one or more spindles and nuts, the one or more brake pads, or both that are in communication with the first drive shaft. The first drive shaft may include one or more detents, notches, grooves, projections, or features that can be engaged by the first gear, the one or more roller assemblies, or both. When the first drive shaft is engaged by the first gear, the one or more roller assemblies, or both, the first drive shaft rotates with the first gear (and the second gear). The first drive shaft may include splines, notches, grooves or teeth for engaging the one or more piston assemblies, the one or more spindles, the one or more nuts, or a combination there to transfer torque from the motor gear unit thereto when engaged by the first gear, the one or more roller assemblies or both so that the one or more brake pads can move relative to the rotor. When the first drive shaft is not engaged, or is disengaged by the first gear, the one or more roller assemblies, or both the first drive shaft does not rotate with the first gear (or the second gear) and may not transfer torque to the one or more spindles, nuts, pistons, or a combination thereof. The first drive shaft may he disengaged by the first gear, the one or more roller assemblies, or both when a predetermined, torque has been applied or transferred from the motor gear unit to the first piston, the first brake pad, an end of the first brake pad (i.e., a leading or trailing end), or a combination thereof. The predetermined torque may be greater than 1 N.m, greater than 5 N.m, greater than 10 N.m, preferably between 20 and 40 N.m, preferably 30 N.m, or greater than 30 N.m. The predetermined torque may he less than 50 N.m, less than 40 N.m, preferably between 31) and 20 N.m, less than 10 N.m, or less than 5 N.m. When the first drive shaft is disengaged by the first gear, the roller assemblies, or both, the roller assemblies may engage a clutch plate, a clutch plate track, a track on the first drive shaft, or as combination thereof.

The second drive shaft may function to transfer torque from the motor gear unit, the first gear, the second gear, or a combination thereof to the one or more piston assemblies, the one or more spindles and nuts, the one or more brake pads, or a combination thereof that are in communication with the second drive shaft. The second drive shaft may be rotationally engaged by the second gear so that the second drive shaft always rotates with the second gear (and the first gear) or may be engaged and disengaged by the second gear, the one or more roller assemblies, or both so that the second drive shaft only rotates with the second gear (and the first gear) when engaged. The second drive shaft may include one or more detents, notches, grooves, projections, or features that can be engaged by the second gear, the one or more roller assemblies, or both. The second drive shaft may include splines, notches, teeth or grooves for engaging the one or more piston assemblies, the one or more spindles, the one or more nuts, or a combination there to transfer torque from the motor gear unit thereto so that the one or more brake pads or ends of one or more brake pads can move relative to the rotor. When the second drive shaft is not engaged, or is disengaged by the second gear, the one or more roller assemblies, or both the second drive shaft does not rotate with the second gear (or the first gear) and may not transfer torque to the one or more spindles, nuts, pistons, or a combination thereof. The second drive shaft may be disengaged by the second gear, the one or more roller assemblies, or both when a predetermined torque has been applied or transferred from the motor gear unit to the second piston, the second brake pad, an end of the brake pad, or a combination thereof. The predetermined torque may be greater than 1 N.m, greater than 5 N.m, greater than 10 N.m, preferably between 20 and 40 N.m, preferably 30 N.m, or greater than 30 N.m. The predetermined torque may be less than 50 N.m, less than 40 N.m, preferably between 30 and 20 N.m, less than 10 N.m, or less than 5 N.m. When the second drive shaft is disengaged by the second gear, the roller assemblies, or both, the roller assemblies may engage a track on the second drive shaft.

The one or more roller assemblies may function to engage and disengage the first drive shaft the second drive shaft, or both. The one or more roller assemblies may be any mechanism that can engage and disengage the first drive shaft, the second drive shaft or both. The one or more roller assemblies may include one or more rollers connected to a pivot arm, a pivot post, or both. The one or more rollers may engage and disengage one or more detents, notches, grooves, projections, or features of the first drive shaft, the second drive shaft, or both. One or more biasing members (i.e., spring(s) or any suitable resilient element(s)) may function to bias the one or more roller assemblies into and out of engagement with first drive shaft, the second drive shaft, or both. The one or more roller assemblies may include only a roller in communication with the one or more biasing members that bias the roller into and out of engagement with the first drive shaft, the second drive shaft, or both. The one or more biasing members may engage one or more rollers and bias the one or more rollers into and out of engagement with the detents of the first drive shaft, the second drive shaft, or both. The one or more roller assemblies may pivot about pivot posts or projections extending from a face of the first gear, the second gear, or both. The one or more roller assemblies may be located on a front thee of the first gear, the second gear, or both (i.e., a face facing the rotor), on a second face of the first gear, the second gear, or both (i.e., a face facing away from the rotor), or may be located on both faces.

When the one or more roller assemblies engage the first drive shaft, torque generated by the motor gear unit may be transferred from the first gear, to the first drive shaft. When the one or more roller assemblies engage the first drive shaft, the first drive shaft may rotate with the first gear, so that the one or more piston assemblies, spindles, nuts, and brake pads in communication with the first gear, the first drive shaft, or both can move relative to the rotor (i.e., towards or away from the rotor). When the one or more roller assemblies disengage the first drive shaft, the first drive shaft may not rotate with the first gear, so that the one or more piston assemblies, spindles, nuts, or a combination thereof in communication with the first drive shaft, the first gear, or both do not move relative to the rotor. When the one or more roller assemblies disengage the first drive shaft, the one or more roller assemblies may engage a clutch plate, one or more tracks on the first drive shaft, or both. When the one or more roller assemblies disengage the first drive shaft, torque generated by the motor gear unit may not be transferred to the first drive shaft, but may still be transferred to the first gear, the second gear, and a second drive shaft connected to the second gear.

When the one or more roller assemblies engage the second drive shaft, torque generated by the motor may be transferred to the second drive shaft connected to the second gear. When the one or more roller assemblies engage the second drive shaft, the second spindle may rotate with the second gear, so that the one or more piston assemblies in communication with the second spindle can move relative to the rotor. When the roller assemblies disengage the second drive shaft, the second drive shaft may not rotate with the second gear, so that the one or more piston assemblies in communication with the second drive shaft do not move relative to the rotor. When the one or more roller assemblies disengage the second drive shaft, the one or more roller assemblies may engage one or more detents on the second drive shaft. When the roller assemblies disengage the second drive shaft, torque generated by the motor gear unit may not transferred to the second drive shaft, but may be transferred to the first gear, the second gear, and a first drive shaft connected to the first gear.

The one or more clutch plates may function to be engaged by the one or more roller assemblies when the one or more roller assemblies engage, disengage, or both the first drive shaft. The one or more clutch plates may include one or more detents, grooves, channels, or features for the one or more roller assemblies to engage when the roller assemblies engage the first drive shaft. The one or more clutch plates may rotate with the first gear and the first drive shaft when the one or more roller assemblies engage the one or more clutch plates and the first drive shaft. The one or more clutch plates may rotate freely when the roller assemblies disengage the clutch plate and engage a track on the one or more clutch plates. The one or more clutch plates may rotate with the first gear when the roller assemblies disengage the first drive shaft and the clutch plate but engage the clutch arms. The clutch arms may extend radially from a center of the one or more clutch plates. The roller assemblies may engage the track so that the roller assemblies are prevented from engaging the first drive shaft. The roller assemblies may engage the track so that the second drive shaft and the second gear can rotate and move a piston assembly and therefore an end of the brake pad towards or away from a rotor without rotating the first drive shaft (and therefore not moving the other piston assembly towards or away from the rotor). The roller assemblies may engage the track when one end of a brake pad (i.e., a leading edge) is worn more or worn further than an opposing edge (i.e., a trailing edge). By engaging the clutch track, the second drive shaft may continue to rotate (with the motor gear unit rotating the first gear and the second gear) and move the one or more piston assemblies, brake pads, or an end of a brake pad until the friction material of the brake pad engages the rotor to create the parking brake force.

The one or more piston assemblies may function to move the one or more brake pads toward or away from the rotor. The one or more piston assemblies may be any mechanism configured to move or assist in moving the one or more brake pads relative to the rotor. The one or more piston assemblies may he located entirely or at least partially within a brake caliper. The one or more piston assemblies may function to transfer rotational force from the motor gear unit, the one or more gears, the one or more spindles, nuts, or a combination thereof into linear force to axially move the one or more brake pads relative to the rotor. The one or more piston assemblies may be in communication with a single brake pad or pressure plate so that all or a portion of a brake pad can be moved towards the rotor to create a parking brake clamp force. For example, if multiple piston assemblies are located on one side of the rotor, one piston assembly may be moved or actuated at a time so that a first end of the brake pad (i.e., a leading end or a trailing end) contacts the rotor before a second end of the same brake pad (i.e., a trailing end, or a leading end) contacts the rotor. The one or more piston assemblies may include a first piston assembly and a second piston assembly. The first piston assembly may be disposed near a first end of a brake pad (i.e., a leading end) and the second piston assembly may be disposed near a second end of a brake pad (i.e., a trailing end). The one or more piston assemblies may each include a piston, a nut, and a spindle.

The one or more pistons may function to move one or more brake pads relative to a rotor. The one or more pistons may move towards or away from the rotor along a piston axis. The one or more pistons may move in and out of a piston opening in the brake caliper. The one or more pistons may seal a piston opening in the brake caliper so that a fluid is trapped within the piston opening, the piston, or both. The one or more pistons may have sufficient strength so that the one or more pistons can be moved with fluid, air, by an electrical device such a motor or motor gear unit, a mechanical device such as a piston and nut, or a combination thereof. One or more of the pistons may engage a single pressure plate near a first end of the brake pad, while one or more pistons may engage the pressure plate near a second end of the brake pad. The one or more pistons may be moved towards or away from a brake pad in unison, sequentially, or both. The one or more pistons may be moved towards or away from a brake pad sequentially so that a first end of the brake pad moves while a second end of a brake pad is not moved, and/or vice versa. The one or more pistons may be moved towards or away from the one or more brake pads in unison, sequentially, or both. The one or more pistons may include as front end is may be generally flat for engaging and moving the pressure plate towards or away from the rotor, and a back end which may include a pocket that may he keyed for receiving an actuating device, such as a linkage, a nut, a spindle, or a combination thereof. The front end of the one or more pistons may be securely attached or coupled to the pressure plate of the brake pad, or the front end may removeably or selectively engage the pressure plate once the piston contacts the pressure plate. The pocket may extend at least partially through the piston towards as generally flat portion or pocket wall. The pocket may be configured to receive and/or engage a nut.

The one or more nuts may function to engage the one or more pistons so that the one or more piston assemblies can move the one or more pistons, the one or more brake pads or both, relative to a rotor. The one or more nuts may include a first nut and a second nut. The first nut may engage a first piston located near a first end of a brake pad (i.e., a leading end) and the second nut may engage a second piston locate near a second end of a brake pad (i.e., a trailing end). The one or more nuts may engage the one or more pockets with a threaded engagement, a sliding engagement, an interference engagement, a permanent engagement, a removable engagement, a keyed engagement, or a combination thereof. The one or more nuts may be at least partially received into the one or more pockets. A moving three may be applied to the one or more nuts to move the one or more pistons relative to the rotor. The one or more nuts may at least partially move relative to the pockets and the pocket walls without the piston and the brake pad moving relative to the rotor (i.e., a gap may extend between the nut and the pocket walls). The gap may be between 0 and 3 mm, between 0 and 2 mm, preferably between 0 and 1 mm, more preferably 0.5 mm. For example, the nut may mechanically engage the pocket and may be moved axially within the pocket a certain distance before the nut engages the pocket wall to move the piston relative to brake pad to push the brake pad towards the rotor. The one or more nuts may rotate within the pocket, translate along an axis within the pocket or a combination thereof to advance or retract the piston, the brake pad, or both relative to the rotor. The one or more nuts may be integrally formed with the one or more pistons. A spindle may be connected to the nut.

The one or more spindles may engage one or both of the drive shafts and may function to move the one or more pistons, the one or more brake pads, or both relative to a rotor. The one or more spindles may be any mechanism configured to move so that the spindles can transfer rotational force from the motor gear unit, the gears, the drive shafts, or a combination thereof into linear force to move the nut, the piston assemblies, the brake pads or a combination thereof to create a friction force, a braking force, as parking brake force, or a combination thereof. The one or more spindles may be at least partially received in the one or more pockets in the one or more pistons. The one or more spindles may include one or more threaded portions, teeth, notches, grooves, or a combination thereof engaging the one or more drive shahs and the one or more nuts to assist in axially moving the one or more pistons. The one or more spindles may include opposing ends, each of which engage the one or more drive shafts and the one or more nuts via a threaded engagement, a friction engagement, an interference engagement, a keyed engagement, or may be coupled thereto with mechanical fasteners. The one or more spindles may threadably engage the one or more nuts, pistons, or both. For this, the one or more spindles may each include one or more threaded portions. A first spindle may threadably engage the first nut, the first piston, or both, and a second spindle may threadably engage the second nut, the second piston, or both. The thread length, lead, pitch, and/or starts may be the same between each of the one or more spindles, or may be different. For example, the thread pitch cm the first spindle may be larger (e.g., 1.6 mm per rotation) than the thread pitch of the second spindle (e.g., 1.5 mm per rotation), or vice versa. In other words, the ratio of thread pitch of the first spindle to the second spindle may be 1.05:1, 1.1:1 or 1.2:1, or vice versa. A difference in thread pitch may provide for the first spindle to move the first nut towards the first piston, the first pocket wall, or both (and therefore move the first end of the brake pad towards and/or away from the rotor) faster than the second spindle moves the second nut towards and/or away from the second piston, the second pocket wall, or both (and therefore move the second end of the brake pad towards and/or away from the rotor), or vice versa. Spindles including different or varying thread pitches may be used in combination, with gears having the same number of teeth (i.e., 1:1 gear ratio) or with gears having a different number of teeth (i.e., 1:1.05 or 1:1.1 or 1:1.2 gear ratio) in order to customize, vary, and/or perfect the speed and distance that the one or more pistons, spindles, nuts, brake pads, ends of a brake pad, or a combination thereof move relative to a rotor.

The one or more spindles, the one or more nuts and/or the one or more pistons may be a single integrally formed component or mechanism. The one or more spindles may rotate within the piston pocket; translate along an axis within the piston pocket or a combination thereof to advance or retract the nut, the piston, the brake pad, or a combination thereof relative to the rotor.

Figure 1:
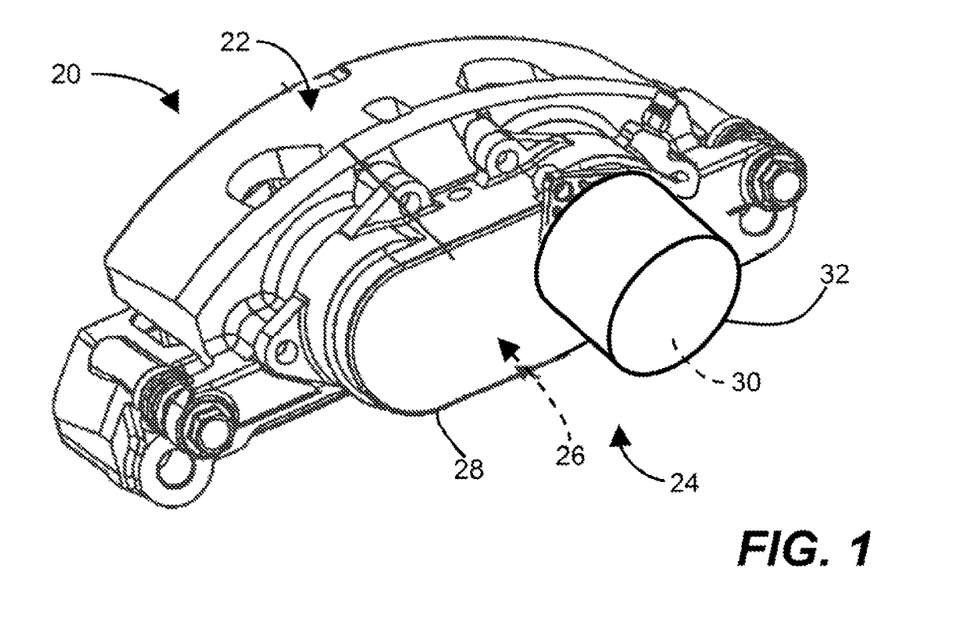
FIG. 1 is a perspective view of a brake assembly including a brake caliper and a parking brake assembly in accordance with the teachings herein.
Figure 2:
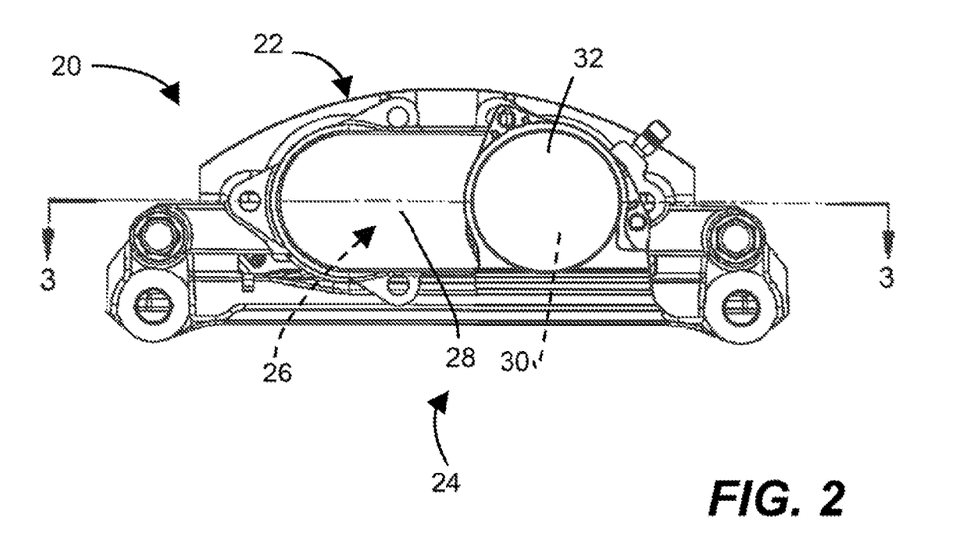
FIG. 2 is a front view of a brake assembly including a brake caliper and a parking brake assembly in accordance with the teachings herein.

FIGS. 1 and 2 illustrate a brake assembly 20. The brake assembly 20 includes a brake caliper 22 and an electromechanical parking brake system 24. The electromechanical parking brake system 24 includes a sequential parking brake assembly 26 located in a sequential parking brake assembly housing 28, and a motor gear unit (MGU) 30 located in a housing 32.

Figure 3:
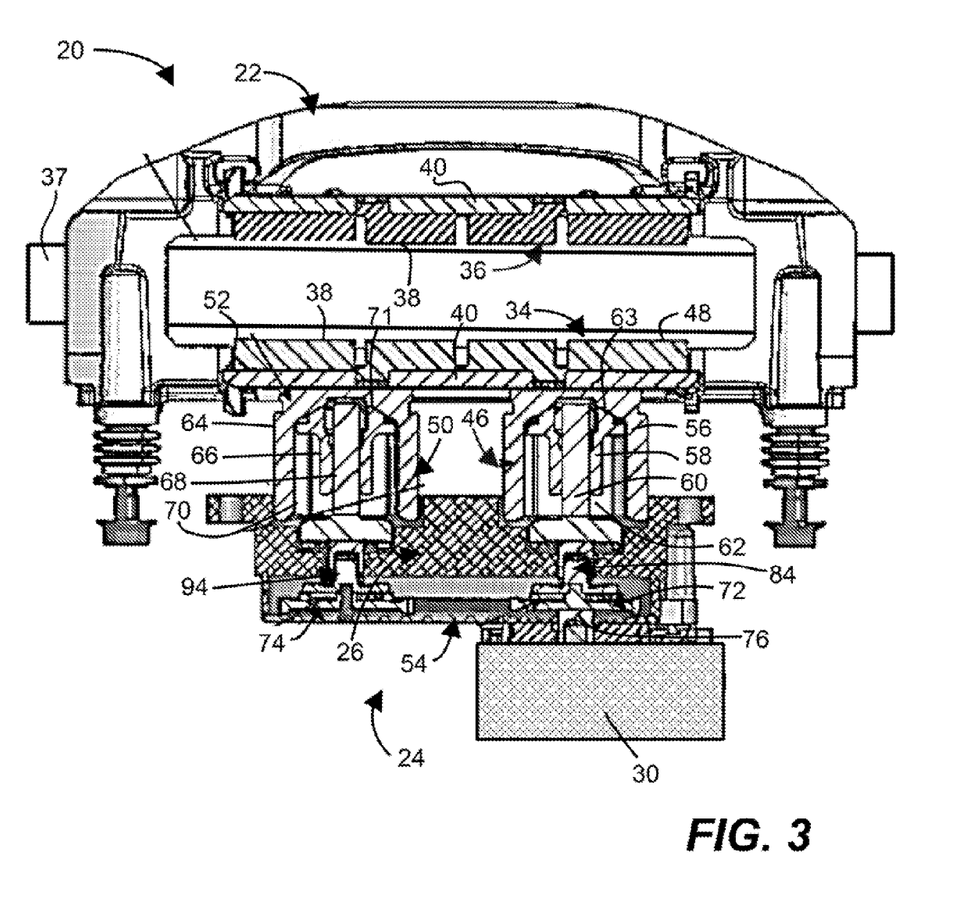
FIG. 3 is a cross-sectional view of a brake assembly including a brake caliper and a parking brake assembly taken along line 3-3 of FIG. 2 in accordance with the teachings herein.

FIG. 3 further illustrates the brake assembly 20. The brake caliper 22 includes a first brake pad 34 and to second brake pad 36. A rotor 37 extends between the first brake pad 34 and the second brake pad 36. The first brake pad 34 and second brake pad 36 each include a friction material 38 and a pressure plate 40. The sequential parking brake assembly 26 includes as first piston assembly 46 located near a first end 48 of the first brake pad 34, a second piston assembly 50 located near a second end 52 of the first brake pad 34, and a sequential piston apply mechanism 54 in communication with both the first piston assembly 46 and the second piston assembly 50. The first piston assembly 46 includes a first piston 56, a first nut 58, and a first spindle 60. The first piston 56 interfaces with the pressure plate 40 near the first end 48 of the first brake pad 34. The first piston 56 includes a first pocket 62 with as pocket wall 63. The first nut 58 is received in the first pocket 62 and threadably engages the first spindle 60.

With continued reference to FIG. 3, the second piston assembly SO includes a second piston 64, a second nut 66, and a second spindle 68. The second piston 64 interfaces with the pressure plate 40 near the second end 52 of the first brake pad 34. The second piston 64 includes a second pocket 70 with a pocket wall 71. The second nut 66 is received in the second pocket 70 and threadably engages the second spindle 68.

Figure 4:
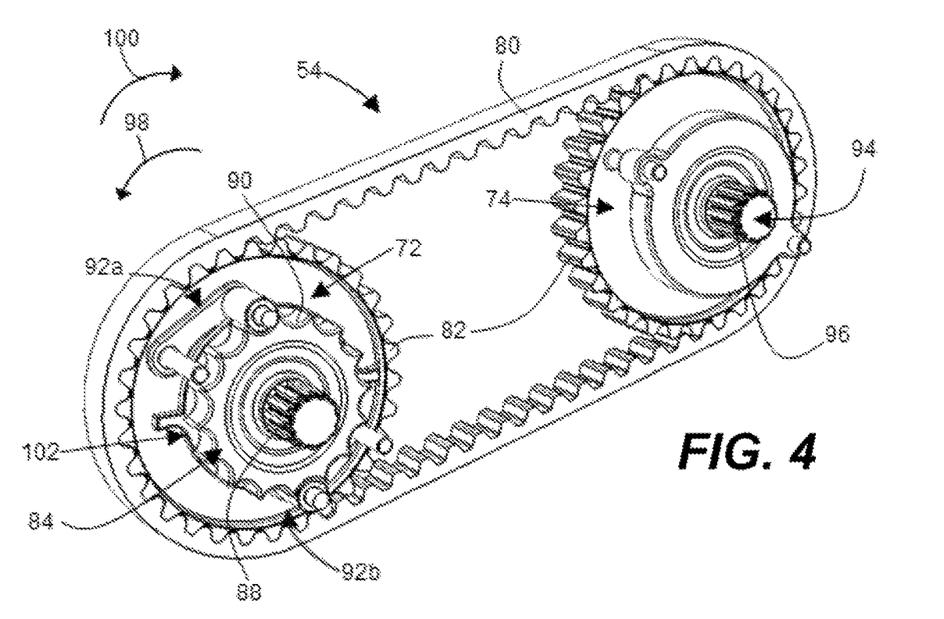
FIG. 4 is a front perspective view of a sequential piston apply mechanism in accordance with the teachings herein.
Figure 5:
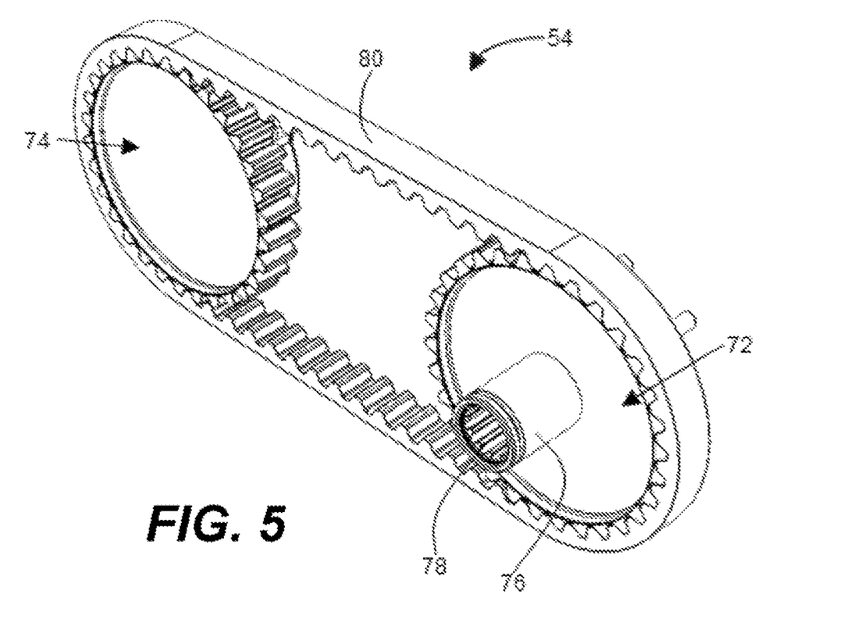
FIG. 5 is a rear perspective view of a sequential piston apply mechanism in accordance with the teachings herein.

FIGS. 4 and 5 illustrate the sequential piston apply mechanism 54. The sequential piston apply mechanism 54 includes a first gear 72 and a second gear 74. The first gear 72 includes an input splined shaft 76 with splines 78. The input splined shaft 76 is engaged by the MGU 30 (FIG. 3). The MGU 30 is configured to rotate the first gear 72 in a first direction 98 to apply the parking brake and in a second direction 100 to release the parking brake. A belt or chain 80 engages teeth 82 located on the first gear 72 and the second gear 74 so that the second gear 74 rotates with the first gear 72 when the first gear 72 is rotated. A first drive shaft 84 interfaces with a pair of roller assemblies 92a, 92b that are connected to the first gear 72. The first drive shaft 84 includes detents 90 and splines 88. The roller assemblies 92a, 92b selectively engage the detents 90 (as shown in FIG. 4) and also selectively disengage the detents 90. The splines 88 engage the first spindle 60. When the roller assemblies 92a, 92b engage the detents 90, the first drive shaft 84 rotates with the first gear 72 and causes the splines 88 and therefore the first spindle 60 to rotate. Rotation of the first spindle 60 causes the first nut 58 to linearly travel toward the pocket wall 63 of the first piston 56 and then move the first piston 56. Movement of the first piston 56 causes the first end 48 of the first brake pad 34 to move towards or away from the rotor 37 (See FIG. 3). When the roller assemblies 92a, 92b disengage the detents 90, the first drive shaft 84 and the splines 88 do not rotate with the first gear 72 and, accordingly, the first spindle 60 does not rotate. Thus, the first piston 56 does not move, nor does the first end 48 of the first brake pad 34. A clutch plate 102 is located between the first gear 72 and the first drive shaft 84.

With continued reference to FIGS. 4 and 5, the second gear 74 includes a second drive shaft 94 with splines 96. The second drive shaft 94 rotates with the second gear 74. When the second drive shaft 94 is rotated, the second spindle 68, which engages the splines 96, rotates. Rotation of the second spindle 68 causes the second nut 66 linearly travel toward the pocket wall 71 of the second piston 64 and move the second piston 64, which therefore causes the second end 52 of the first brake pad 34 to move towards or away from the rotor 37 (FIG. 3).

Figure 6:
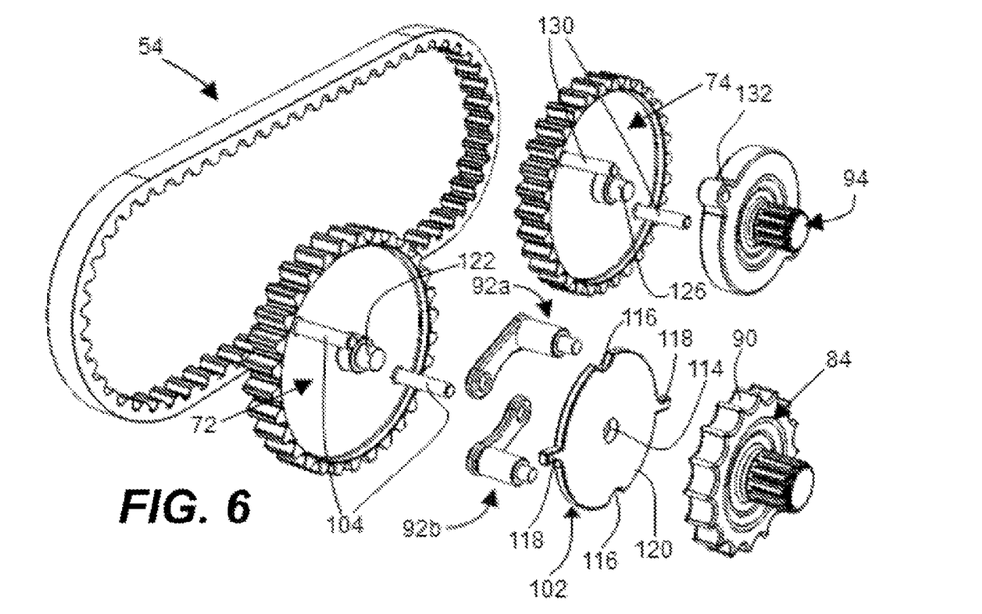
FIG. 6 is an exploded front perspective view of a sequential piston apply mechanism in accordance with the teachings herein.
Figure 7:
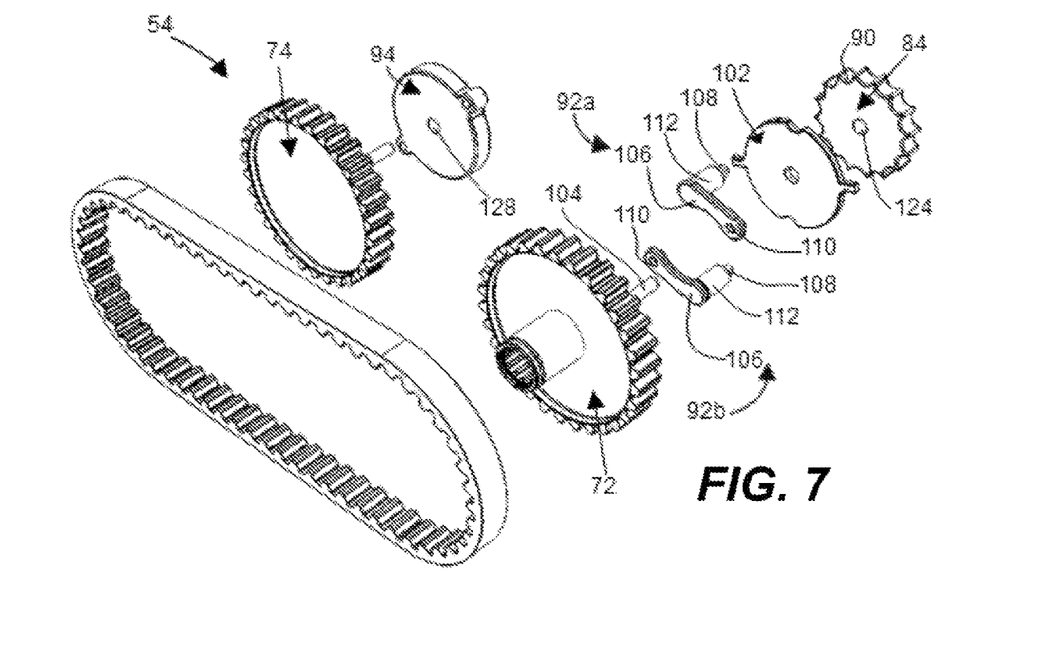
FIG. 7 is an exploded rear perspective view of a sequential piston apply mechanism in accordance with the teachings herein.

FIGS. 6 and 7 further illustrate the sequential piston apply mechanism 54. The first gear 72 includes a projection 122 and pivot pins 104 about which the roller assemblies 92a, 92b move to engage and disengage detents 90 of the first drive shaft 84. Each roller assembly 92a, 92b includes a pivot arm 106 and a pivot post 108. Each pivot arm 106 includes a hole 110 engaging a respective pivot pin 104. A roller 112 engages each pivot post 108. The clutch plate 102 includes a through hole 114, detents 116, clutch arms 118, and a track 120. The through hole 114 engages the projection 122 of the first gear 72. In addition to engaging and disengaging the detents 90 of the first drive shaft 84, the roller assemblies 92a, 92b also engage and disengage the detents 116 of the clutch plate 102. When the roller assemblies 92a, 92b engage the detents 116, the clutch plate 102 rotates with the first gear 72. When the roller assemblies 92a, 92b disengage the detents 116, the clutch plate 102 does not rotate with the first gear 72. The first drive shaft 84 includes a blind hole 124 engaging the projection 122 of the first gear 72. The second drive shaft 94 includes a blind hole 128 engaging the projection 126 of the second gear 74. The second gear includes pins 130 engaging holes 132 of the second drive shaft 94.

With reference to the FIGS. 3-7, engaging the electromechanical parking brake system 24 will now be described. It is understood that before engaging the electromechanical parking brake system 24, the first nut 58 and the pocket wall 63 of the first piston 56 are separated by a first gap (not illustrated), and the second nut 66 and the pocket wall 71 of the second piston 64 are separated by a second gap (also not illustrated). The second gap is also understood to be larger than the first gap. When the electromechanical parking brake system 24 is initially started, the MGU 30 rotates the first gear 72 in the first direction 98. Via the belt or chain 80, the second gear 74 also rotates in the first direction 98. With the roller assemblies 92a, 92b in engagement with the detents 90 of the first drive shaft 84 and the detents 116 of the clutch plate 102, the first drive shaft 84 and the clutch plate 102 rotate with the first gear 72 in the first direction 98. With the first drive shaft 84 engaging with the first spindle 60 via the splines 88, the first spindle 60 also rotates and moves the first nut 58 towards the pocket wall 63 of the first piston 56 to so that the first gap is taken up. At the same time, rotation of the second gear 74 in the first direction 98 causes the second drive shaft 94 to rotate. Because the second drive shaft 94 is engaged with the second spindle 68 via the splines 96, the second spindle 68 also rotates and moves the second nut 66 towards the pocket wall 71 of the second piston 64 so that the second gap is taken up. After the first gap is taken up, and the first drive shaft 84 continues to rotate and move the first nut 58 against the pocket wall 63 of the first piston 56, the first piston 56 moves and pushes the first end 48 of the first brake pad 34 against the rotor 37 and begins to generate a clamp load. Because the second gap is larger than the first gap, the second gap continues to be reduced while clamp load is generated as the first piston 56 pushes the first end 48 of the first brake pad 34 against the rotor 37. Accordingly, a majority of the torque generated by the MGU 30 can be transmitted to the first spindle 60 to push the first brake pad 34 against the rotor 37 while the second spindle 68 continues to reduce the second gap between the second nut 66 and the pocket wall 71 of the second piston 64. Once the MGU 30 has transmitted a predetermined torque to the first piston 56 (i.e., once the first piston 56 has pushed the first end 48 of the first brake pad 34 sufficiently against the rotor 37), the roller assemblies 92a, 92b disengage the detents 90, 116 so that the first drive shaft 84 and the clutch plate 102, respectively no longer rotate with the first gear 72. As the MGU 30 continues to rotate the first and second gears 72, 74, torque is no longer transmitted to the first drive shaft 84. Instead, the torque is transmitted to the second drive shaft 94 while the remaining second gap between the second nut 66 and the pocket wall 71 of the second piston 64 continues to be reduced. Once the second gap is eliminated, the torque is transmitted to the second drive shaft 94 to move the second piston 64 against the pressure plate 44 to push the second end 52 of the first brake pad 34 against the rotor 37.

While the roller assemblies 92a, 92b are disengaged from the detents 90, 116, the roller assemblies 92a, 92b contact the track 120 of the clutch plate 102. As the MGU 30 continues to rotate and the second end 52 of the first brake pad 34 is pushed against the rotor 37, the roller assemblies 92a, 92b may contact the clutch arms 118. In the case that the roller assemblies 92a, 92b contact the clutch arms 118, the clutch plate 102 will once again minimally rotate minimally with the first gear 72 until the second piston 64 has sufficiently pushed the second end 52 of the first brake pad 34 against the rotor 37 to a target force at which time electrical power to the MGU 30 is stopped.

The case described above is when the first end 48 and second end 52 of the first brake pad 34 are essentially the same thickness, which normally occurs when the first brake pad 34 and second brake pad 40 are new. Over time, however, the second end 52 of the first brake pad 34 (i.e., the leading end) may wear more than the first end 48 (i.e., the trailing end), which may require the second. piston 64 and the second end 52 of the first brake pad 34 to move a greater distance to engage the rotor 37. This is known in the art as tangential taper or taper wear. In this regard, the distance that the second end 52 or the leading end of the first brake pad 34 must move to engage the rotor 37 may continuously change and become larger as second end 52 wears. To account for tangential taper, especially in braking applications including two piston assemblies, engaging larger and/ or elongated brake pads, while the roller assemblies 92a, 92b are disengaged from the detents 90 of the first drive shaft 84, the roller assemblies 92a, 92b roll along the track 120 and then contact the clutch arms 118 so that the clutch plate 102 rotates with the first gear 72 while the first drive shaft 84 is stationary. As clutch plate 102 rotates, the detents 116 on clutch plate 102 rotate and begin to rotate away from the detents 90 on the first drive shaft 84 that were aligned with at the start of the parking brake apply, and begin to partially align with the next set of detents 90 on the first drive shaft 84. Accordingly, the second piston 64 can move the second end 52 of the first brake pad 34 against the rotor 37 until a sufficient parking brake force is realized and the MGU 30 is stopped. Stated another way, while the second piston 64 moves the second end 52 of the first brake pad 34 against the rotor, the roller assemblies 92a, 92b engage the arms 118 and rotate the clutch plate 102 and thus the detents 116. Once the second piston 64 moves the second end 52 of the first brake pad 34 against the rotor 37 and a sufficient parking brake force is realized, the MGU 30 is stopped.

To manage a reverse taper condition, where, for example, the first end 48 (i.e., the leading end) of the first brake pad 34 wears more, or faster, than the second end 52 (i.e., the trailing end), the number of teeth 82 on the first gear 72 may be less than the number of teeth 82 on the second gear 74. Accordingly, when the MGU 30 rotates the first gear 72 (and therefore the second gear 74 by means of the belt or chain 80), the second gear 74 may rotate slightly slower than the first gear 72, thus allowing the first piston assembly 46 and the first end 48 of the first brake pad 34 more time to engage the rotor 37. Additionally, or alternatively the thread pitch on the first spindle 60 may be lamer than the thread pita on the second spindle 68 so that When the MGU 30 rotates the first gear, the second nut 66 may advance slightly slower toward the second piston 64 than the first nut 58 advances toward the first piston 56, allowing the first piston assembly 46 and the first end 48 of the first brake pad 34 more tune to engage the rotor 37.

With reference to the FIGS. 3-7, disengaging the electromechanical parking brake system 24 will now be described. Before disengaging the electromechanical parking brake system 24, it is understood that the first piston 56 and the second piston 64 are generally in contact with the pressure plate 44; the friction surface 38 of the first brake pad 34 is generality in contact with the rotor 37; and the roller assemblies 92a, 92b are disengaged from the detents 90, 116 of the first drive shaft 84 and the clutch plate 102, respectively (i.e., the roller assemblies 92a, 92b are in contact with clutch arms 118, and the detents 116 may be partially aligned with a set of detents 90, due to clutch plate 102 rotation in response to tangential taper). Once the electromechanical parking brake system 24 is disengaged, the MGU 30 may rotate the first gear 72 and the second gear 74 in the second direction 100. Because the roller assemblies 92a, 92b are disengaged from the detents 90 of the first drive shaft 84 and are located on the track 120 of the clutch plate 102, the torque from the MGU is only to the second drive shaft 94. Accordingly, the second piston 64 can move the second end 52 of the first brake pad 34 away from the rotor 37. As the first and second gears 72, 74 rotate in the second direction 100, the roller assemblies 92a, 92b rotate along the track 120 away from the clutch arms 118 until the roller assemblies 92a, 92b engage the detents 116 of the clutch plate 102 and the detents 90 in the first drive shaft 84. At this time, the second piston 64 is no longer applying clamp load force on the second end 52 of the first brake pad 34. Thereafter, only minimal torque is necessary to rotate second gear 74. Once the roller assemblies 92a, 92b engage the detents 90 of the first drive shaft 84, the torque from the MGU 30 cart be transmitted to the first drive shaft 84 so that the first end 48 of the first brake pad 34 is moved away from the rotor 37.

Figure 8:
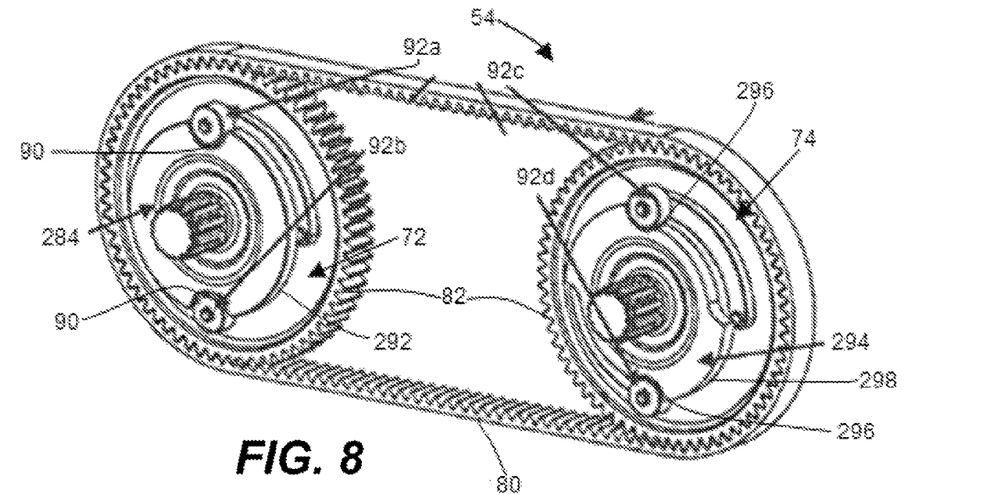
FIG. 8 is a front perspective view of a sequential piston apply mechanism in accordance with the teachings herein.
Figure 9:
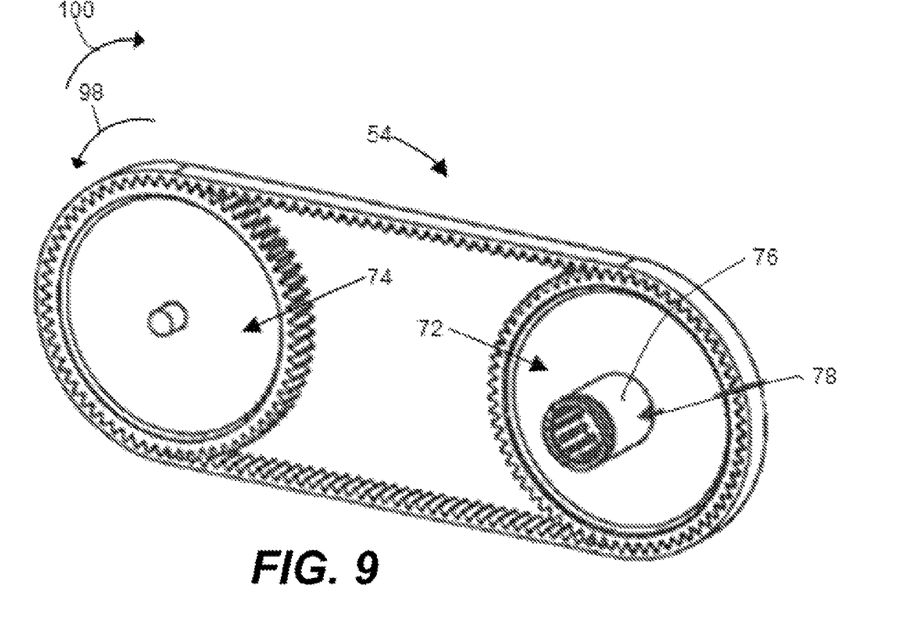
FIG. 9 is a rear perspective view of a sequential piston apply mechanism in accordance with the teachings herein.

FIGS. 8 and 9 illustrate the sequential piston apply mechanism 54. The sequential piston apply mechanism 54 includes as first gear 72 and a second gear 74. The first gear 72 includes an input splined shaft 76 with splines 78. The input splined shaft 76 is in communication with the MGU 30 (FIG. 3), The MGU 30 is configured to rotate the first gear 72 in a first direction 98 and a second direction 100. A belt or chain 80 engages teeth 82 located on the first gear 72 and the second gear 74 so that the second gear 74 rotates with the first, gear 72 when the first gear 72 is rotated by the MGU 30.

A first drive shaft 284 is connected to the first gear 72. The first drive shaft 284 includes detents 90. A pair of roller assemblies 92a, 92b engage and disengage the detents 90. When the roller assemblies 92a, 92b engage the detents 90, the first drive shaft 284 rotates with the first gear 72 and causes the first spindle 60 to rotate. Rotation of the first spindle 60 causes the first nut 58 to move the first piston 56, which therefore causes the first end 48 of the first brake pad 34 to move towards or away from the rotor 37 (See FIG. 3). When the roller assemblies 92a, 92b disengage the detents 10 and instead engage a track 292 on the first drive shaft 284, the first drive shaft 284 does not rotate with the first gear 72, and, thus, the first spindle 60 does not rotate. As such, the first piston 56 does not move, and accordingly, the first end 48 of the first brake pad 34 is not moved relative to the rotor 37.

A second drive shaft 294 is connected to the second gear 74. The second drive shaft 294 includes detents 296. A pair of roller assemblies 92c, 92d are configured to engage and disengage the detents 296. When the roller assemblies 92c, 92d engage the detents 296, the second drive shaft 294 rotates with the second gear 74 and causes the second spindle 68 to rotate. Rotation of the second spindle 68 causes the second nut 66 to move the second piston 64, which therefore causes the second end 52 of the first brake pad 34 to move towards or away from the rotor 37 (See FIG. 3). When the roller assemblies 92c, 92d disengage the detents 296 and engage the track 298, the second drive shaft 294 does not rotate with the first and second gears 72, 74, and the second spindle 68 does not move. As such, the second piston 64 does not move, and accordingly, the second end 52 of the first brake pad 34 is not moved relative to the rotor 37.

With continued reference to FIGS. 8 and 9, the sequential piston apply mechanism 54 is configured so that both gears 72, 74 initially rotate at the same time and move the first end 48 and the second end 52 of the brake pad 34 towards the rotor 37 at the same time until the roller assemblies 92c, 92d disengage the detents 296 on the second drive shaft 294 (i.e., once a first torque has been applied to the second drive shaft 294). Once the roller assemblies 92c, 92d disengage the detents 296, the roller assemblies 92c, 92d roll along a track 298 on the second drive shaft 294 so that the second drive shaft 294 does not rotate. With the roller assemblies 92a, 92b continuing to engage the detents 90 of the first drive shaft 284, the first drive shaft 284 continues to rotate with the first gear 72 so that the first end 48 of the first brake pad 34 continues to move towards the rotor 37. Once the first end of the first brake pad 34 has sufficiently engaged the rotor, the roller assemblies 92a, 92b disengage the detents 90 and engage the track 292 on the first drive shaft 284. At that time, the roller assemblies 92c, 92d may he generally close to the end of the track 298 of the second drive shaft 294. The roller assemblies 92c, 92d then re-engage the detents 296 so that the second drive shaft 294 once again can continue to move the second end 52 of the brake pad 34 until the second end 52 has sufficiently engaged the rotor 37.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to he 0.0001, 0.001, 0.01 or 0.1 as appropriate. These are only examples of what is specifically intended and all possible combinations of numerical values between the lowest value and the highest value enumerated are to be considered to he expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might he divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A brake system comprising:
   a parking brake assembly including:
      i. a first drive shaft;
      ii. a second drive shaft; and
      iii. a motor;
   a brake pad;
   wherein when the first drive shaft is engaged and the first drive shaft is moved by the motor, a first portion of the brake pad is moved relative to a rotor,
   wherein when the second drive shaft is engaged and the second drive shaft is moved by the motor, a second portion of the brake pad is moved relative to the rotor,
   wherein when the first drive shaft is disengaged, the first portion of the brake pad is not moved relative to the rotor regardless if the first drive shaft is moved by the motor, and when the second drive shaft is disengaged, the second porton of the brake pad is not moved relative to the rotor regardless if the second drive shaft is moved by the motor, and
   wherein either the first portion or the second portion of the brake pad is moved relative to the rotor before the other of the first portion or the second portion is moved relative to the rotor.

2. The brake system of claim 1, wherein the parking brake assembly includes:
   i. a first gear that selectively engages the first drive shaft and selectively disengages the first drive shaft;
   ii. a second gear that engages the second drive shaft; and
   iii. a motor gear unit in cornmunication with the first gear and causing both the first gear and the second gear to rotate, the motor gear unit comprises the motor;
   wherein the first gear selectively engages the first drive shaft so that the first drive shaft rotates with the first gear and moves the first portion of the brake pad relative to the rotor,
   wherein the first gear selectively disengages the first drive shaft so that the first drive shaft does not rotate with the first gear and does not move the first portion of the brake pad relative to the rotor, and
   wherein the second gear rotates the second drive shaft and moves the second portion of the brake pad relative to the rotor.

3. The brake system of claim 2, wherein the first gear includes at least one roller assembly and the first drive shaft includes detents,
   wherein the at least one roller assembly rotates with the first gear and selectively engages the detents so that the first drive shaft rotates with the first gear and moves the first portion of the brake pad relative to the rotor, and
   wherein the at least one roller assembly selectively disengages the detents so that the first drive shaft does not rotate with the first gear and does not move the first portion of the brake pad relative to the rotor.

4. The brake system of claim 3, wherein the at least one roller assembly includes:
   i. a pivot arm that pivots about a pin located on the first gear;
   ii. a pivot post connected to the pivot arm;
   iii. and a roller engaging the pivot post;
   wherein the pivot arm is biased so that the roller engages the detents of the first drive shaft when the at least one roller assembly selectively engages the detents and pivots about the pin to disengage the detents when the at least one roller assembly selectively disengages the detents.

5. The brake system of claim 4, wherein the parking brake assembly includes a clutch plate located between the first gear and the first drive shaft, the clutch plate includes a track and detents,
   wherein the rollers engage the detents of the clutch plate when the rollers engage the detents of the first drive shaft, and
   wherein the rollers engage the track when the rollers disengage the detents of the first drive shaft.

6. The brake system of claim 2, wherein the motor gear unit causes the first gear to rotate in a first direction and in a second direction,
   wherein the motor gear unit rotates the first gear in the first direction and the first gear selectively engages the first drive shaft so that the first drive shaft moves the first portion of the brake pad towards the rotor, and
   wherein the second drive shaft moves the second portion of the brake pad towards the rotor when the motor gear unit rotates the first gear in the first direction regardless if the first gear selectively engages or disengages the first drive shaft.

7. The brake system of claim 6, wherein when the motor gear unit rotates the first gear in the second direction and the first gear selectively engages the first drive shaft, the first drive shaft moves the first portion of the brake pad away from the rotor, and
   wherein the second drive shaft moves the second portion of the brake pad away from the rotor when the motor gear unit rotates the first gear in the second direction regardless if the first gear selectively engages or disengages the first drive shaft.

8. The brake system of claim 1, wherein the brake system is a hydraulic brake system that includes a pair of brake pistons that are moved with fluid to move the brake pad relative to the rotor, and
   wherein the parking brake system is an electrometrical system that moves the brake pistons and the brake pad relative to the rotor by moving the first drive shaft and the second drive shaft.

9. A brake assembly including:
   a. a brake caliper including:
      i. a brake pad;
   b. a. parking brake system including:
      i. a first drive shaft;
      ii. a first gear selectively engaging the first drive shaft and selectively disengaging the first drive shaft;
      iii. a second drive shaft;
      iv. a second gear engaging the second drive shaft; and
      v. a motor gear unit engaging the first gear and causing both the first gear and the second gear to rotate in a first direction and in a second direction;
   wherein the first gear selectively engages the first drive shaft so that the first drive shaft rotates with the first gear and causes the first portion of the brake pad to move relative to a rotor,
   wherein the first gear selectively disengages the first drive shaft so that the first drive shaft does not rotate with the first gear and the first portion of the brake pad does not move relative to the rotor, and
   wherein the second gear rotates the second drive shaft and moves the second portion of the brake pad relative to the rotor.

10. The brake assembly of claim 9, wherein the first gear includes one or more roller assemblies and the first drive shaft includes detents,
    wherein the one or more roller assemblies rotate with the first gear and selectively engage the detents so that the first drive shaft rotates with the first gear and moves the first portion of the brake pad relative to the rotor, and
wherein the one or more roller assemblies selectively disengage the detents so that the first drive shaft does not rotate with the first gear and does not move the first portion of the brake pad relative to the rotor.

11. The brake assembly of claim 10, wherein the parking brake system includes:
    i. a clutch plate located between the first gear and the first drive shaft, the clutch plate includes a track and detents,
    wherein the one or more roller assemblies engage the detents of the clutch plate when the one or more roller assemblies engage the detents of the first drive shaft, and
    wherein the one or more roller assemblies engage the track when the one or more roller assemblies disengage the detents of the first drive shaft.

12. The brake assembly of claim 10, wherein each of the roller assemblies includes:
    i. a pivot arm pivoting about a pin located on the first gear;
    ii. a pivot post connected to the pivot arm;
    iii. and a roller engaging the pivot post,
    wherein the pivot arm is biased so that the roller engage the detents of the first drive shaft when the pair of roller assemblies selectively engage the detents and pivots about the pin to disengage the detents when the pair of roller assemblies selectively disengage the detents.

13. The brake assembly of claim 9, wherein when the motor gear unit rotates the first gear in the first direction and the first gear selectively engages and first drive shaft, the first drive shaft moves the first portion of the brake pad towards the rotor, and
    wherein the second drive shaft moves the second portion of the brake pad towards the rotor when the motor gear unit rotates the first gear in the first direction regardless if the first gear selectively engages or disengages the first drive shaft.

14. The brake assembly of claim 9, wherein when the motor gear unit rotates the first gear in the second direction and the first gear selectively engages and first drive shaft, the first drive shaft moves the first portion of the brake pad away from the rotor, and
    wherein the second drive shaft moves the second portion of the brake pad away from the rotor when the motor gear unit rotates the first gear in the second direction regardless if the first gear selectively engages or disengages the first drive shaft.

15. A method for applying a parking brake comprising:
    providing a parking brake assembly configured for use with a brake system including a brake pad and a rotor, the parking brake assembly including:
    i. a first drive shaft; and
    ii. a second drive shaft;
    engaging the first drive shaft;
    applying a torque to the first drive shaft with a motor gear unit so that the first drive shaft rotates and moves a first portion of the brake pad towards the rotor;
    disengaging the first drive shaft after a predetermined torque is applied to the first drive shaft so that the first portion of the brake pad is no longer moved;
    rotating the second drive shaft with the motor gear unit after the first drive shaft is disengaged so that a second portion of the brake pad is moved towards the rotor.

16. The method of claim 15, wherein the step of engaging the first drive shaft includes:
    biasing one or more roller assemblies into detents located on the first drive shaft, and wherein the step of disengaging the first drive shaft includes:
    biasing the one or more roller assemblies out of detents located on the first drive shaft.

17. The method of claim 16, wherein the step of biasing the one or more roller assemblies out of detents located on the first drive shaft further includes:
    engaging rollers of the one or more roller assemblies onto a circular track.

18. The method of claim 15, wherein the parking brake assembly includes a first gear and a second gear,
    wherein the motor gear unit is connected to the first gear and causes the first gear to rotate,
    wherein the one or more roller assemblies are connected to the first gear,
    wherein the first drive shaft is connected to the first gear and rotates with the first gear when the one or more roller assemblies engage the detents, and
    wherein the second drive shaft is connected to the second gear and rotates with the second gear.

19. The method of claim 18, wherein the parking brake assembly includes a belt, and both of the first gear and the second gear include teeth, and
    wherein the belt engages the teeth on both the first gear and the second gear so that both the first gear and the second gear rotate together.

20. The method of claim 15, wherein the predetermined torque corresponds to a friction portion of the brake pad engaging the rotor and preventing the rotor from rotating.

* * * * *

UNITED STATES PATENT AND TRADEMARK OFFICE
CERTIFICATE OF CORRECTION

PATENT NO. : 9,644,693 B2  
APPLICATION NO. : 14/940297  
DATED : May 9, 2017  
INVENTOR(S) : Galus Chelaidite et al.

It is certified that error appears in the above-identified patent and that said Letters Patent is hereby corrected as shown below:

In the Claims

Column 17, Line 31:
Delete "cornmunication", insert --communication--

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*